(12) United States Patent
McGrath

(10) Patent No.: US 8,270,119 B2
(45) Date of Patent: Sep. 18, 2012

(54) DISK DRIVE HAVING REDUCED MAGNETIC FLUX LEAKAGE

(75) Inventor: Michael C. McGrath, Pleasanton, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 528 days.

(21) Appl. No.: 12/474,163

(22) Filed: May 28, 2009

(65) Prior Publication Data
US 2010/0302686 A1    Dec. 2, 2010

(51) Int. Cl.
*G11B 5/55* (2006.01)
(52) U.S. Cl. ........................................ 360/264
(58) Field of Classification Search .................. 360/264
See application file for complete search history.

(56) References Cited

U.S. PATENT DOCUMENTS

| 5,698,911 | A | 12/1997 | Dunfield et al. |
| 5,793,572 | A * | 8/1998 | Lalouette et al. .......... 360/256.1 |
| 6,304,421 | B1 * | 10/2001 | Brown ....................... 360/264.8 |
| 7,161,768 | B1 | 1/2007 | Oveyssi |
| 7,327,537 | B1 | 2/2008 | Oveyssi |
| 7,372,670 | B1 | 5/2008 | Oveyssi |

* cited by examiner

*Primary Examiner* — Jami M Valentine
(74) *Attorney, Agent, or Firm* — Patterson & Sheridan, LLP

(57) ABSTRACT

In a voice coil motor (VCM) of a disk drive, a coined feature formed on a ferromagnetic plate reduces magnetic flux leakage from a disk drive without increasing the weight of the drive or adding complexity to the manufacturing process. The coined feature is shaped and positioned to alter the path of magnetic flux lines produced by the VCM in a way that significantly reduces the flux leakage from the VCM. The coined feature may be formed without adding material to the ferromagnetic plate by the same stamping process used to fabricate the plate.

18 Claims, 5 Drawing Sheets

DISK DRIVE HAVING REDUCED MAGNETIC FLUX LEAKAGE

BACKGROUND OF THE INVENTION

1. Field of the Invention

Embodiments of the present invention relate generally to disk drives and, more particularly, to disk drives having reduced magnetic flux leakage.

2. Description of the Related Art

Disk drives, and especially disk drives for mobile applications, are tightly constrained to simultaneously achieve low cost, low weight, and low power consumption. As higher performance, e.g., shorter seek time, and greater data capacity are demanded for such drives, satisfying cost, weight, and power requirements becomes increasingly difficult. This is particularly true for the voice coil motor (VCM) used in disk drives to position the read/write head over a desired data storage track.

When shorter seek times are desired, or the inertia of the head stack assembly is increased to enable higher drive capacity, the VCM must have higher torque. Because increased power consumption is generally not acceptable, higher torque is typically achieved by increasing the magnetic flux density in the VCM. Magnetic flux density can be increased by using a higher energy magnet material and/or by increasing the volume of the magnets. In either case, without other design changes to the VCM, the increased magnetic flux in the VCM produces a higher level of magnetic flux leakage outside the disk drive, which may be unacceptable.

Increased flux leakage from the VCM and, consequently, from the disk drive, is typically controlled with a larger return path or by creating additional return paths for the magnetic flux. Steel plates generally form the return paths for magnetic flux in a disk drive VCM, and increasing the width and/or thickness of such plates in high flux density areas can control flux leakage when higher energy or higher volume magnets are used. However, the addition of material to high flux density areas in the steel plates in a VCM results in undesirable VCM weight increases and will usually increase cost of the VCM. To offset such weight increases, weight is removed in other areas, adding complexity to the stamping process that is typically employed for fabricating the steel plates. In addition, removal of material from other areas of the steel plates creates design compromises that may reduce design margin, increase cost, and limit performance of the disk drive.

In light of the above, there is a need in the art for a means to reduce magnetic flux leakage from a disk drive without increasing weight or adding complexity to the manufacturing process.

SUMMARY OF THE INVENTION

One or more embodiments of the invention provide a means for reducing magnetic flux leakage from a disk drive without increasing the weight of the drive or adding complexity to the manufacturing process. The embodiments contemplate a coined feature or bump formed in at least one ferromagnetic plate in a voice coil motor (VCM) of a disk drive, where the ferromagnetic plate provides magnetic flux return paths for the magnet or magnets of the VCM. The coined feature is shaped and positioned to alter the path of magnetic flux lines produced by the VCM in a way that significantly reduces the flux leakage from the VCM. The coined feature may be formed without adding material to the ferromagnetic plate by the same stamping process used to fabricate the plate.

A disk drive according to an embodiment of the invention includes at least one storage disk, at least one actuator arm assembly including a transducer element using which data is read from and written to the storage disk, and a voice coil motor for positioning the actuator arm assembly, wherein the voice coil motor includes at least one ferromagnetic plate on which at least one magnet is mounted and the at least one ferromagnetic plate has a coined section that: (i) has substantially the same thickness as other parts of the ferromagnetic plate, (ii) projects away from the at least one magnet, and (iii) is positioned near a neutral zone of the at least one magnet. The neutral zone is the transition between regions of different magnetic polarity.

A voice coil motor for a disk drive according to an embodiment of the invention includes a first ferromagnetic plate on which a magnet is mounted, and a second ferromagnetic plate on which a magnet is mounted, wherein the first ferromagnetic plate has a stamped section that: (i) has substantially the same thickness as other parts of the first ferromagnetic plate, (ii) projects away from the magnets, and (iii) is positioned near a neutral zone of the magnets.

A voice coil motor for a disk drive according to another embodiment of the invention includes at least one magnet mounted between a pair of ferromagnetic plates, one of the ferromagnetic plates having a stamped section formed therein proximate the neutral zone of the at least one magnet, wherein the stamped section is configured to project away from the at least one magnet and add minimal reluctance to the magnetic flux flow.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention provide a means for reducing magnetic flux leakage from a disk drive without increasing the weight of the drive or adding complexity to the manufacturing process. The embodiments contemplate a coined feature or bump formed in a ferromagnetic plate in a voice coil motor (VCM) of a disk drive, where the ferromagnetic plate provides magnetic flux return paths for the magnet or magnets of the VCM. The coined feature is shaped and positioned to alter the path of magnetic flux lines produced by the VCM in a way that significantly reduces the flux leakage from the VCM, while having a minimal effect on VCM performance.

The coined feature is disposed in a region of the ferromagnetic plate that is saturated with magnetic flux and/or is closer to saturation with respect to other regions of the plate. In addition, the coined feature projects from the plane of the ferromagnetic plate away from the magnets of the VCM, and includes at least one stamped edge that alters the path of magnetic flux lines produced by the VCM in a way that significantly reduces the flux leakage from the VCM. In one embodiment, the stamped edge is substantially perpendicular to the plane of the ferromagnetic plate and substantially parallel to the primary lines of flow of magnetic flux in a high flux density region of the plate. When so oriented, the stamped edge or edges of the coined feature discourage magnetic flux lines from bunching or concentrating in the high flux density region of the ferromagnetic plate, thereby distributing the flux lines more evenly throughout the plate. In other embodiments, the coined feature may have other shapes (e.g., very sharp transitions) that add little or no reluctance in the direction of the primary lines of flow of magnetic flux and provide substantially more reluctance in the direction perpendicular to the primary lines of flow of magnetic flux. The coined feature may be formed without adding material to the ferromagnetic plate and by the same stamping process used to fabricate the plate. Consequently, the coined feature as described herein adds no weight to the disk drive or complexity to the manufacturing process, while significantly reducing magnetic flux leakage from the disk drive.

Figure 1:
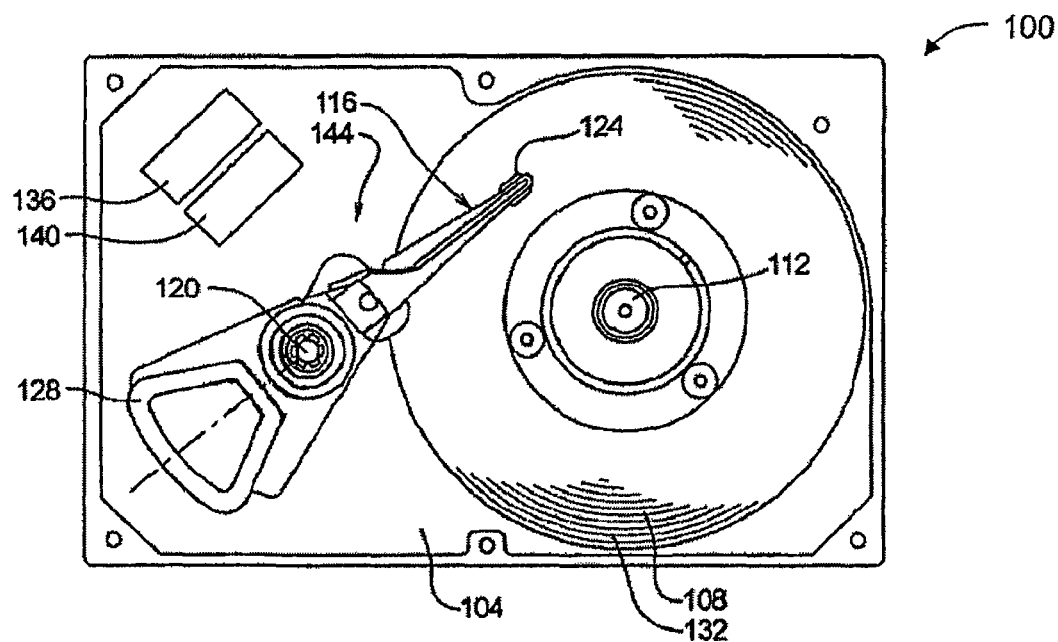
FIG. 1 is a plan view of a disk drive that can benefit from embodiments of the invention as described herein.

FIG. 1 is a plan view of a disk drive 100 according to an embodiment of the invention. For clarity, disk drive 100 is illustrated without a top cover. Disk drive 100 includes a base 104, an actuator arm assembly 116 and a magnetic disk 108. For clarity of description, disk drive 100 is illustrated with a single storage disk 108 and actuator arm assembly 116. Disk drive 100 may, however, also include multiple storage disks 108 and multiple actuator arm assemblies 116. Storage disk 108 is interconnected to base 104 by a spindle motor (not shown) mounted within or beneath a hub 112, such that storage disk 108 can be rotated relative to base 104. Actuator arm assembly 116 is interconnected to base 104 by a bearing 120 and includes a transducer element 124 constructed on actuator arm assembly 116 as shown. Transducer element 124 includes a read element and a write element and transfers data to and from a surface of storage disk 108. A VCM 128 pivots the actuator arm assembly 116 about bearing 120 to radially position transducer element 124 with respect to storage disk 108. By changing the radial position of the transducer element 124 with respect to storage disk 108, transducer element 124 accesses different tracks 132 on storage disk 108. VCM 128 is operated by a controller 136 that is, in turn, operatively coupled to a host computer (not shown). A channel 140 processes information read from storage disk 108 by transducer element 124, and a servo control system 144 controls the position of transducer element 124 with respect to the particular track 132 being followed.

Figure 2:
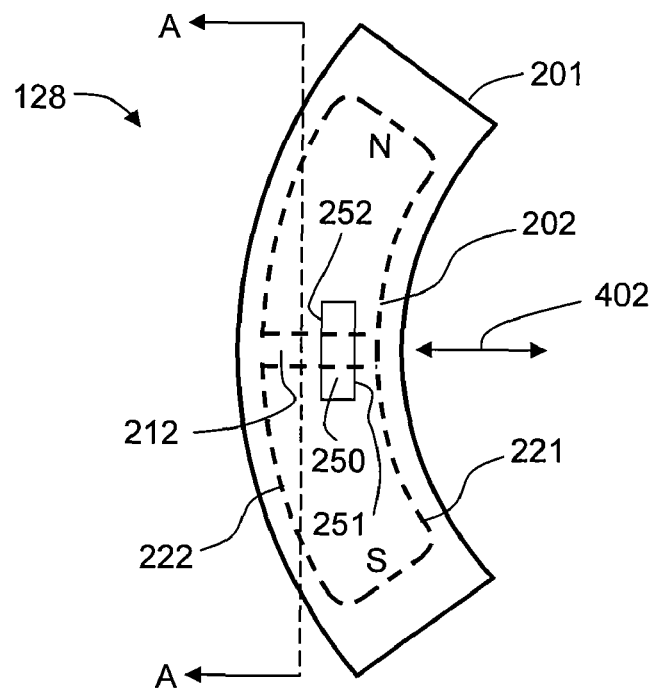
FIG. 2 is a partial plan view of a voice coil motor (VCM), according to an embodiment of the invention.

FIG. 2 is a partial plan view of VCM 128, which includes an upper ferromagnetic plate 201, a curved upper magnet 202, a lower ferromagnetic plate 203 (shown in FIGS. 3A, 3B), and a curved lower magnet 204 (also shown in FIGS. 3A, 3B), according to an embodiment of the invention. Curved upper magnet 202 is mounted on the lower, or hidden, surface of upper ferromagnetic plate 201, and curved lower magnet 204 is mounted on the upper surface of lower ferromagnetic plate 203. Curved upper magnet 202 is magnetized to have two sections of opposite polarity, denoted N and S, the transition between the sections being the neutral zone 212. Alternately, magnet 202 can be made of two separate pieces positioned with the polarities opposite. Curved lower magnet 204 is similarly configured, with two sections of opposite polarity and a neutral zone 214, which is illustrated in FIGS. 3A and 3B.

Figure 3A:
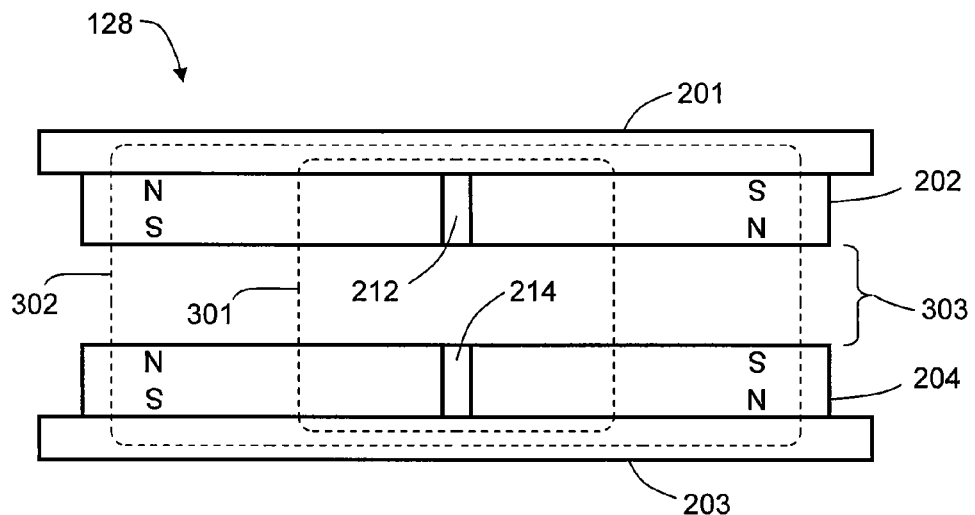
FIG. 3A is a partial cross-sectional view of one type of VCM design in which one or more embodiments of the invention can be implemented.
Figure 3B:
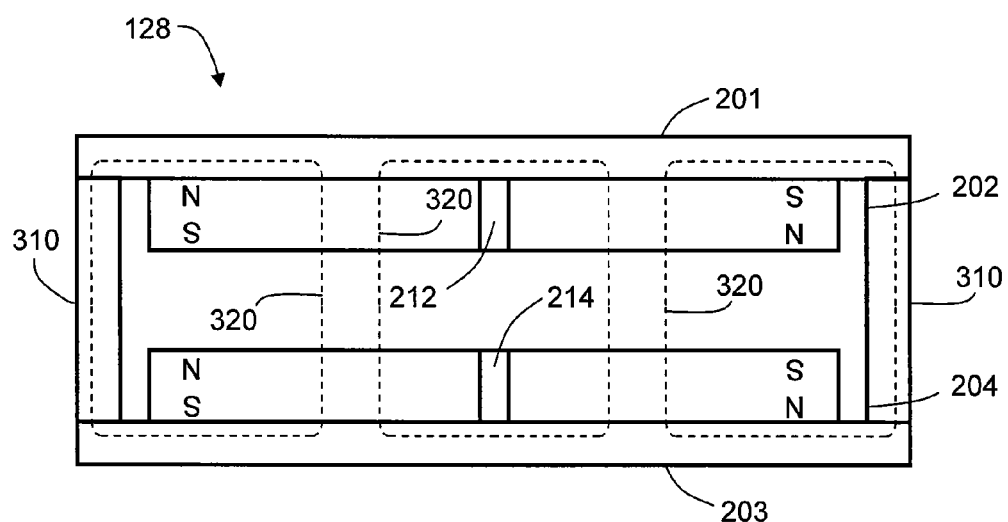
FIG. 3B is a partial cross-sectional view of another type of VCM design in which one or more embodiments of the invention can be implemented.

FIGS. 3A and 3B are partial cross-sectional views of two types of VCM design in which one or more embodiments of the invention can be implemented. FIG. 2 fairly represents the partial plan views of both types of VCM design.

FIG. 3A is a partial cross-sectional view of a first type of VCM 128 taken at section line A-A in FIG. 2, illustrating the relative positions of upper ferromagnetic plate 201, curved upper magnet 202, lower ferromagnetic plate 203, and curved lower magnet 204. With the magnetic poles oriented as shown in FIG. 3A, magnetic flux lines 301, 302 flow in a loop, with the highest flux density usually being in the area of neutral zone 212 and/or neutral zone 214. An electrical coil (not shown for clarity) is disposed in the air gap 303 and is used to generate torque for VCM 128. Upper ferromagnetic plate 201 and lower ferromagnetic plate 203 are comprised of a ferromagnetic material, such as low carbon steel. Because ferromagnetic materials have several orders of magnitude greater permeability than the surrounding air, the majority of magnetic flux lines flow through the material of upper ferromagnetic plate 201 and lower ferromagnetic plate 203. However, as the material of upper ferromagnetic plate 201 and lower ferromagnetic plate 203 approach saturation, for example, when a VCM design is modified to include a higher energy magnet, magnetic flux is conducted less efficiently, resulting in greater magnetic flux leakage from VCM 128. According to an embodiment, a coined feature 250, as shown in FIG. 2, is disposed on the top surface of upper ferromagnetic plate 201 and/or the bottom surface of lower ferromagnetic plate 203 to alter the magnetic flux flow in upper ferromagnetic plate 201, and is described in greater detail below.

FIG. 3B is a partial cross-sectional view of a second type of VCM 128 taken at section line A-A in FIG. 2. The configuration and relative positions of upper ferromagnetic plate 201, curved upper magnet 202, lower ferromagnetic plate 203, and curved lower magnet 204 are substantially similar to those illustrated in FIG. 3A, except that upper ferromagnetic plate 201 and lower ferromagnetic plate 203 are joined by vertical legs 310. Vertical legs 310 are also comprised of ferromagnetic material and are often incorporated as features of one or both of the ferromagnetic plates 201 and 203. They are used to create multiple flux loops 320 in VCM 128 as shown. Multiple flux loops 320 reduce the total magnetic flux through the neutral zone, which in turn reduces the flux density of upper ferromagnetic plate 201 and lower ferromagnetic plate 203. One of skill in the art will appreciate that even when configured with vertical legs 310, upper ferromagnetic plate 201 and lower ferromagnetic plate 203 may develop high flux density regions and produce unacceptable levels of magnetic flux leakage unless modified with coined feature 250.

Referring back to FIG. 2, coined feature 250 is disposed in a region of upper ferromagnetic plate 201 that is saturated with magnetic flux and/or is closer to saturation with respect to other regions of the plate. One of skill in the art will appreciate that such regions are frequently located adjacent neutral zone 212 and offset toward the inner radius 221 of curved upper magnet 202. This is because the lines of magnetic flux follow the path of least reluctance, which for curved upper magnet 202 is primarily through upper ferromagnetic plate 201, rather than through the surrounding air. And since the path of least reluctance also tends towards the shortest path, the flux density in ferromagnetic plate 201 adjacent neutral zone 212 is not uniform across the cross-section of upper ferromagnetic plate 201, and is instead concentrated at a region closer to inner radius 221 of curved upper magnet 202 than to outer radius 222. One of skill in the art, using conventional methods of modeling and direct measurement, can readily determine an optimal location for coined feature 250 on upper ferromagnetic plate 201.

Coined feature 250 projects from the plane of upper ferromagnetic plate 201 away from the magnets of the VCM, and includes at least one stamped edge 251 that is shaped to provide substantially more reluctance to magnetic flux flow in direction 402 compared to the direction of the primary lines of flow of magnetic flux. In one embodiment, stamped edge 251 has walls that are substantially perpendicular to the plane of the ferromagnetic plate and extend substantially parallel to the primary lines of flow of magnetic flux. For example, coined feature 250 is configured with a rectangular footprint, as depicted in FIG. 2, and consequently has two substantially parallel stamped edges, 251 and 252. Stamped edges 251, 252 alter magnetic flux flow in a way that reduces the flux density of upper ferromagnetic plate 201 in the region proximate coined feature 250. Namely, by increasing reluctance in upper ferromagnetic plate 201 to any components of magnetic flux perpendicular to the main flow, i.e., components of magnetic flux parallel to neutral zone 212, the magnetic flux lines contained in upper ferromagnetic plate 201 are discouraged from concentrating asymmetrically therein and are more evenly distributed throughout upper ferromagnetic plate 201. In this way, the flux density of "hot spots" in upper ferromagnetic plate 201 is significantly reduced. Optimal configurations of coined feature 250 are described below in conjunction with FIGS. 4, 5, and 6A-C.

Because the embodiments of coined feature 250 described herein may be formed in upper ferromagnetic plate 201 as part of a conventional stamping process used to fabricate upper ferromagnetic plate 201, the complexity and cost of the stamping process is not affected. Because no material is added to upper ferromagnetic plate 201, the weight of VCM 128 is not increased and performance thereof is not adversely affected by the addition of coined feature 250.

Depending on the specific configuration of disk drive 100, high flux density areas in upper ferromagnetic plate 201, lower ferromagnetic plate 203, or both may produce unacceptable levels of magnetic flux leakage. In one embodiment of the invention, coined feature 250 may be disposed on lower ferromagnetic plate 203 instead of upper ferromagnetic plate 201. In yet another embodiment, both lower ferromagnetic plate 203 and upper ferromagnetic plate 201 may have coined feature 250 disposed thereon to alter magnetic flux flow in a way that reduces flux density. In yet another embodiment, multiple coined features 250 may be formed in upper ferromagnetic plate 201, lower ferromagnetic plate 203, or both. In such an embodiment, the coined features may be formed proximate each other, in which case the stamped edges of each may be oriented substantially parallel to each other. Alternatively, the multiple coined features 250 may be formed in substantially distal regions of a given ferromagnetic plate, in which case the orientation of each stamped feature may vary.

Figure 3C:
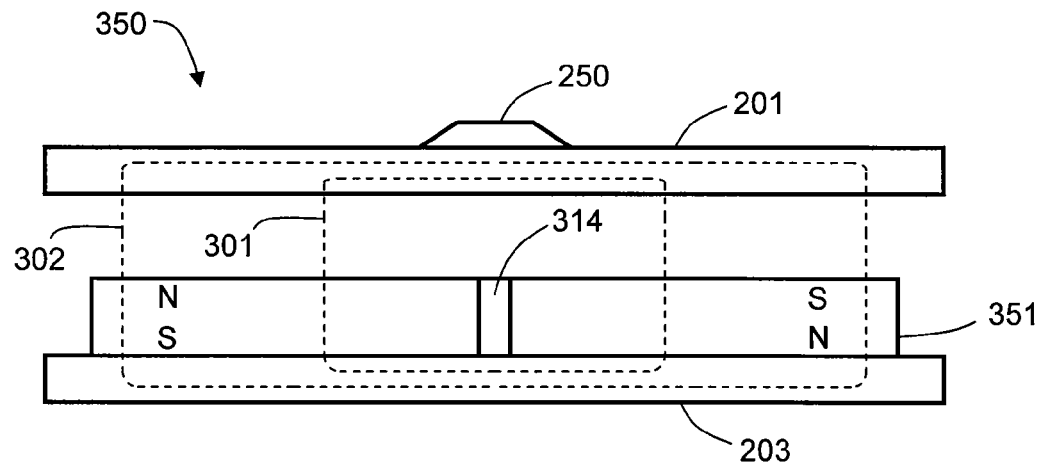
FIG. 3C is a partial cross-sectional view of a single magnet VCM design in which one or more embodiments of the invention can be implemented.

One of skill in the art will appreciate that the above-described embodiments of the invention may be useful for other types of VCM design than those illustrated in FIGS. 3A, 3B, such as a single magnet VCM design. FIG. 3C is a partial cross-sectional view of a single magnet VCM 350 that may benefit from one or more coined features 250. As shown, single magnet VCM 350 includes upper ferromagnetic plate 201, lower ferromagnetic plate 203, and a single magnet 351. In one embodiment, a coined feature 250 is located on the ferromagnetic plate that does not have a magnet mounted thereto, i.e., upper ferromagnetic plate 201, and is positioned to reduce the flux density of hot spots in upper ferromagnetic plate 201. For example, coined feature 250 may be located opposite the neutral zone 314 of single magnet 351, as shown.

Figure 4:
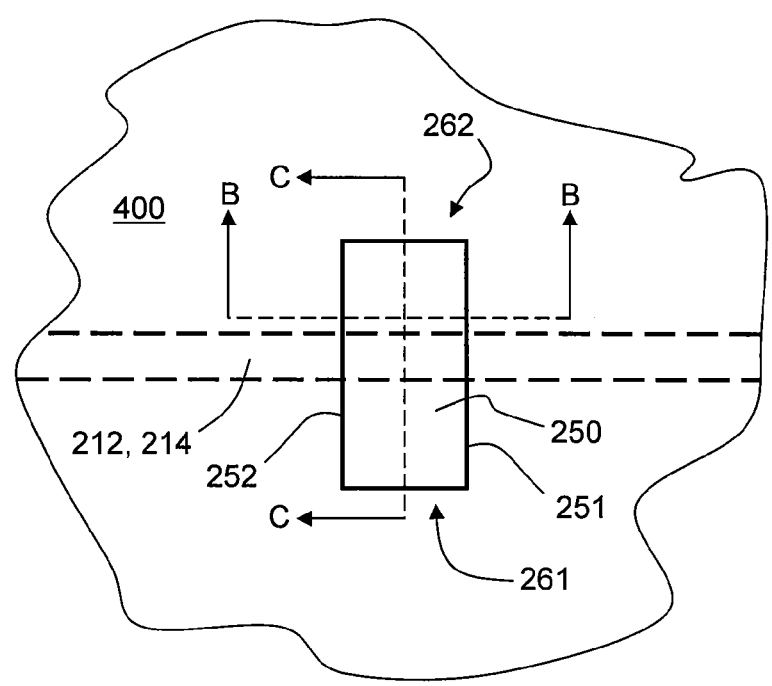
FIG. 4 is a plan view of a coined feature formed on a ferromagnetic plate of a VCM.

As noted above in conjunction with FIG. 2, embodiments of the invention contemplate that coined feature 250 may be configured to provide increased reluctance in a ferromagnetic plate of VCM 128 to any components of magnetic flux perpendicular to the main flow without adding significant reluctance to components of magnetic flux parallel to the main flow. FIG. 4 is a partial plan view of a ferromagnetic plate 400 having a coined feature 250 that meets these requirements, according to embodiments of the invention. Coined feature 250 may have a substantially rectangular footprint with two substantially parallel stamped edges, 251 and 252 and two ends 261, 262, as shown. Stamped edges 251, 252 are illustrated in FIG. 5 and different embodiments of ends 261, 262 are illustrated in FIGS. 6A-C.

Figure 5:
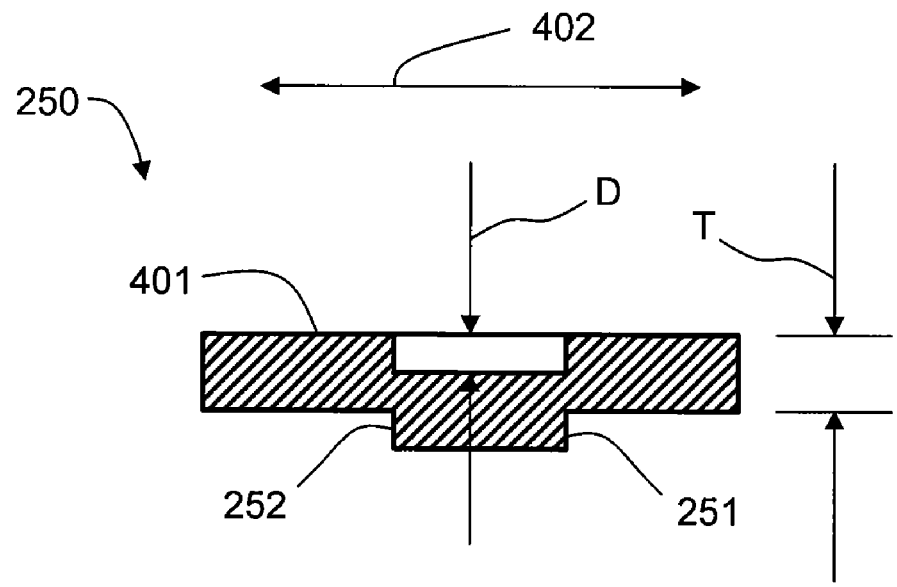
FIG. 5 is a partial cross-sectional view of a coined feature taken at section line B-B in FIG. 4.

FIG. 5 is a partial cross-sectional view of coined feature 250 taken at section line B-B in FIG. 4 illustrating one configuration of stamped edges 251, 252. As noted above in conjunction with FIG. 2, when coined feature 250 is disposed proximate neutral zone 212 or 214, stamped edges 251, 252 may be oriented substantially parallel to the primary flow lines of magnetic flux and perpendicular to neutral zone 212 or 214. In addition, stamped edges 251, 252 are substantially perpendicular to the plane of the ferromagnetic plate, i.e., surface 401, to more effectively add reluctance to magnetic flux that is parallel to arrow 402. Modeling by the inventor indicates that the optimum depth D of coined feature 250 is generally less than half of thickness T of the ferromagnetic plate. When depth D is significantly thicker than half of thickness T, magnetic flux leakage in the high flux density region surrounding coined feature 250 has been shown to increase.

Figure 6A:
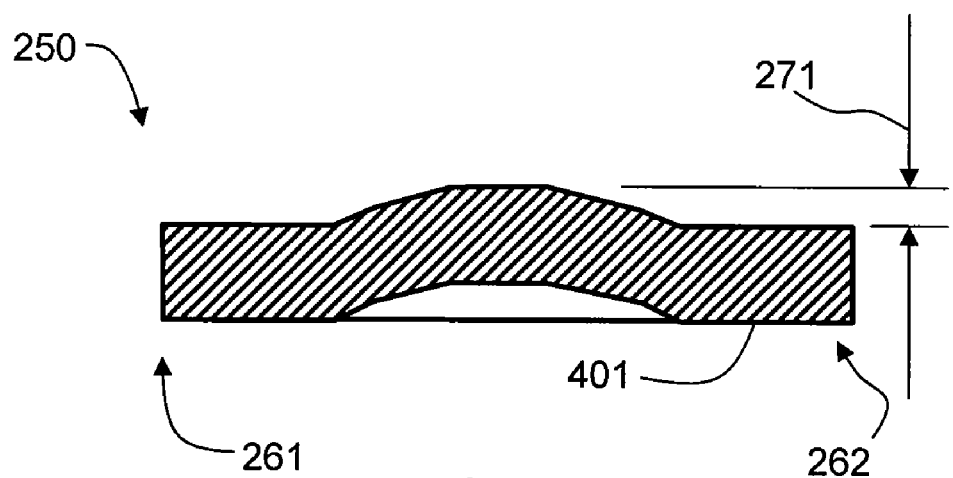
FIGS. 6A-C are partial cross-sectional views of alternative configurations of a coined feature implemented on a ferromagnetic plate of a VCM.
Figure 6B:
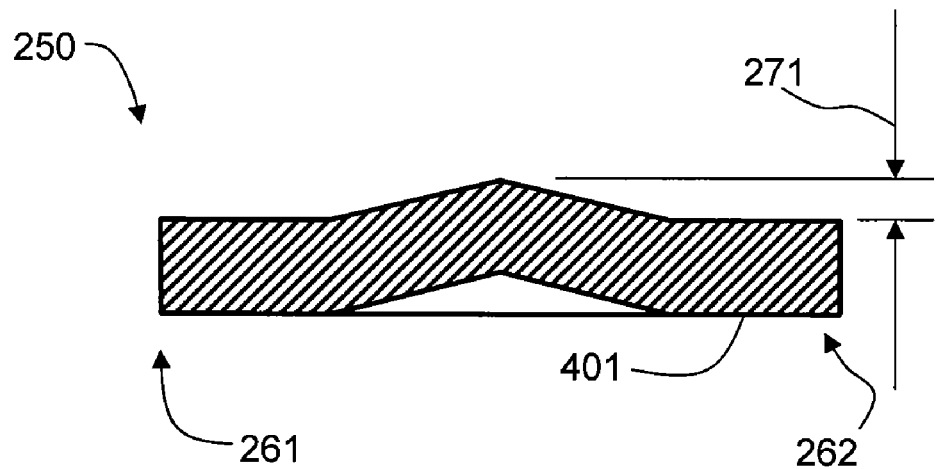
Figure 6C:
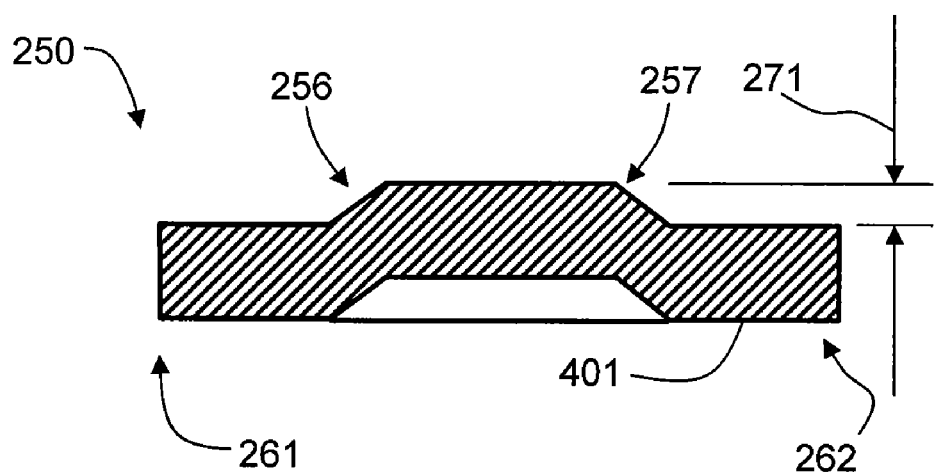

FIGS. 6A-C are partial cross-sectional views of alternative configurations of a coined feature implemented on a ferromagnetic plate of a VCM. In FIG. 6A, coined feature 250 is a smoothly curving arch in cross section. In FIG. 6B, coined feature 250 has a single point in cross section, formed from a single stamped bend. In FIG. 6C, coined feature 250 is formed from two parallel bends 256, 257, and is substantially trapezoidal in cross-section. Although FIGS. 6A-C show sharp corners, there will typically be a radius at one or more of the transitions. Modeling has indicated that the embodiments of coined feature 250 illustrated in FIGS. 6A-C are effective at reducing magnetic flux leakage from VCM 128. For a particular VCM with a ferromagnetic plate 1.2 mm thick, the embodiment of coined feature 250 illustrated in FIG. 6A having bump displacement 271 of 0.5 mm is predicted to reduce peak magnetic flux leakage from VCM 128 from about 380 gauss to about 290 gauss. For the same plate thickness and bump displacement, the embodiment of coined feature 250 illustrated in FIG. 6B is predicted to reduce peak magnetic flux leakage from VCM 128 from about 380 gauss to about 300 gauss. For the same plate thickness and bump displacement, the embodiment of coined feature 250 illustrated in FIG. 6C is predicted to reduce peak magnetic flux leakage from VCM 128 from about 380 gauss to about 270 gauss.

Other configurations of coined feature 250 are also contemplated; however the effect of coined feature 250 on magnetic flux leakage is enhanced when ends 261, 262 of coined feature 250 do not have the "step-like" vertical offset characteristic of stamped edges 251, 252, as illustrated in FIG. 5. Instead, it is preferred that ends 261, 262 smoothly transition into and out of the plane formed by surface 401, where surface 401 is the surface of ferromagnetic plate 400 in contact with a magnet, e.g., curved upper magnet 202 or curved lower magnet 204. In this way, little or no additional reluctance to magnetic flux parallel to the primary lines of flow of magnetic flux is introduced by coined feature 250. Because no material is added to the ferromagnetic plate during the stamping process used to fabricate coined feature 250, the thickness 255 of coined feature 250 is substantially equal to thickness T of the ferromagnetic plate into which coined feature 250 is formed.

While the foregoing is directed to embodiments of the present invention, other and further embodiments of the invention may be devised without departing from the basic scope thereof, and the scope thereof is determined by the claims that follow.

I claim:

1. A disk drive comprising:
   a storage disk;
   an actuator arm assembly including a transducer element using which data is read from and written to the storage disk; and
   a voice coil motor for positioning the actuator arm assembly, the voice coil motor including a ferromagnetic plate on which at least one magnet is mounted, the ferromagnetic plate having a coined section that: (i) has substantially the same thickness as other parts of the ferromagnetic plate, (ii) projects away from said at least one magnet, and (iii) is positioned near a neutral zone of said at least one magnet,
   wherein the coined section has walls that are shaped to impede the magnetic flux flow in a direction that is perpendicular to the magnetic flux flow and extend in a direction that is substantially parallel to the magnetic flux flow.

2. The disk drive according to claim 1, wherein the coined section is formed by stamping the ferromagnetic plate.

3. The disk drive according to claim 1, wherein the depth of the coined section relative to the surface of the ferromagnetic plate tapers to zero on either side of the neutral zone in the direction of the magnetic flux flow.

4. The disk drive according to claim 3, wherein the cross-sectional shape of the coined section taken parallel to the direction of the magnetic flux flow is an arch.

5. The disk drive according to claim 3, wherein the cross-sectional shape of the coined section taken parallel to the direction of the magnetic flux flow is triangular.

6. The disk drive according to claim 3, wherein the cross-sectional shape of the coined section taken parallel to the direction of the magnetic flux flow is trapezoidal.

7. The disk drive according to claim 1, wherein the voice coil motor includes first and second ferromagnetic plates between which at least two magnets are mounted, and a first coined section that: (i) has substantially the same thickness as other parts of the first ferromagnetic plate, (ii) projects away from the magnets, and (iii) is positioned near the neutral zone of the magnets, is formed on the first ferromagnetic plate, and a second coined section that: (i) has substantially the same thickness as other parts of the second ferromagnetic plate, (ii) projects away from the magnets, and (iii) is positioned near the neutral zone of the magnets, is formed on the second ferromagnetic plate.

8. A voice coil motor for a disk drive, comprising:
   a first ferromagnetic plate on which a magnet is mounted; and
   a second ferromagnetic plate on which a magnet is mounted,
   wherein the first ferromagnetic plate has a stamped section that: (i) has substantially the same thickness as other parts of the first ferromagnetic plate, (ii) projects away from the magnets, and (iii) is positioned near a neutral zone of the magnets, and
   wherein the stamped section has edges that extend in a direction that is substantially parallel to the magnetic flux flow.

9. The voice coil motor according to claim 8, wherein the stamped section has walls that are shaped to impede the magnetic flux flow in a direction that is perpendicular to the magnetic flux flow and extend in a direction that is substantially parallel to the magnetic flux flow.

10. The voice coil motor according to claim 8, wherein the depth of the stamped section relative to the surface of the ferromagnetic plate tapers to zero on either side of the neutral zone in the direction of the magnetic flux flow.

11. The voice coil motor according to claim 10, wherein the cross-sectional shape of the stamped section taken parallel to the direction of the magnetic flux flow is an arch.

12. The voice coil motor according to claim 10, wherein the cross-sectional shape of the stamped section taken parallel to the direction of the magnetic flux flow is triangular.

13. The voice coil motor according to claim 10, wherein the cross-sectional shape of the stamped section taken parallel to the direction of the magnetic flux flow is trapezoidal.

14. The voice coil motor according to claim 8, wherein the second ferromagnetic plate has a stamped section that: (i) has substantially the same thickness as other parts of the second ferromagnetic plate, (ii) projects away from the magnets, and (iii) is positioned near a neutral zone of the magnets.

15. A voice coil motor for a disk drive comprising at least one magnet mounted between a pair of ferromagnetic plates, one of the ferromagnetic plates having a stamped section formed therein proximate the neutral zone of said at least one magnet, wherein the stamped section is configured to project away from said at least one magnet and add minimal reluctance to the magnetic flux flow.

16. The voice coil motor according to claim 15, wherein the cross-sectional shape of the stamped section taken perpendicular to the direction of the magnetic flux flow and at the center of the stamped section is rectangular.

17. The voice coil motor according to claim 16, wherein the cross-sectional shape of the stamped section taken perpendicular to the direction of the magnetic flux flow and at all portions of the stamped section is rectangular.

18. The voice coil motor according to claim 17, wherein the depth of the stamped section relative to the surface of the ferromagnetic plate tapers to zero on either side of the neutral zone in the direction of the magnetic flux flow.

* * * * *